United States Patent [19]
Lawandy

[11] Patent Number: 6,088,380
[45] Date of Patent: Jul. 11, 2000

[54] METHOD AND APPARATUS FOR INTRACAVITY PIXELATED LASING PROJECTION

[75] Inventor: Nabil M Lawandy, North Kingston, R.I.

[73] Assignee: Spectra Science Corporation, Providence, R.I.

[21] Appl. No.: 09/070,602

[22] Filed: Apr. 30, 1998

[51] Int. Cl.[7] .................................................. H01S 3/08
[52] U.S. Cl. ............................ 372/102; 372/22; 372/53; 372/70; 353/30; 353/31; 345/33; 345/150; 349/5; 349/10; 349/33; 349/183
[58] Field of Search ................................. 372/22, 53, 70, 372/102; 353/30, 31; 345/150, 33; 349/5, 10, 33, 183

[56] References Cited

U.S. PATENT DOCUMENTS

| | | | |
|---|---|---|---|
| 5,012,274 | 4/1991 | Dolgoff | 340/702 |
| 5,024,524 | 6/1991 | Flasck | 353/31 |
| 5,138,368 | 8/1992 | Kahn | 355/53 |
| 5,760,900 | 6/1998 | Ito | 356/338 |

OTHER PUBLICATIONS

"A noval intracavity pixelated lasing projection system", Nabil Lawandy et al., Proceedings of SPIE Reprint—The International Society for Optical Engineering, vol. 3296, Jan. 1998, 84–91.

"Lasing pixels may form images in projection TV", Nabil Lawandy et al., Laser Focus World, May 1997, 137–141.

"Lasing pixels produce projection display", Kristin Lewotsky, Laser Focus World, Mar. 1997, 15.

"Colourful visions", The Economist, May. 16, 1998.

"Liquid–Crystal–Based Device Provides Brighter Projection Display", Photonics Spectra, Technology World Briefs, Feb. 1997, 50.

*Primary Examiner*—Frank G. Font
*Assistant Examiner*—Gioacchino Inzirillo
*Attorney, Agent, or Firm*—Ohlandt, Greeley, Ruggiero & Perle, LLP

[57] ABSTRACT

A high efficiency, narrow spectral linewidth lasing pixel device that implements a low-voltage spatially patterned variable loss element placed inside an optically pumped high-gain laser cavity is disclosed. The output properties of this system make it useful for digital projection displays. A method for producing a projection image is also disclosed, the method comprises the steps of: providing pump energy for exciting a gain medium disposed within a laser cavity; in response to the excitation, emitting optical energy from the gain medium, wherein the optical energy oscillates within the laser cavity; during an image mode, selectively activating regions of a pixelated loss element disposed in the laser cavity within an oscillation path of the optical energy; wherein when in an on-state, first regions of the pixelated loss element are made substantially transparent to allow the oscillating optical energy to travel through the first regions of the loss element, and wherein when in an off-state, second regions of the pixelated loss element are made reflective to scatter the oscillating optical energy encountering the second regions of the loss element; and outputting the oscillating optical energy that travelled through the first regions of the pixelated loss element to create the projection image.

21 Claims, 8 Drawing Sheets

METHOD AND APPARATUS FOR INTRACAVITY PIXELATED LASING PROJECTION

STATEMENT OF GOVERNMENT RIGHTS

This invention was made with government support under contract number F19628-97-C-0120 by the Rome Lab, Hanscom Air Force Base, DOD. The government has certain rights in the invention.

FIELD OF THE INVENTION

This invention relates to projection imaging systems, and specifically, to projection imaging systems including a lasing pixel device.

BACKGROUND OF THE INVENTION

Color projection displays have become an essential element in today's imaging applications. Steady evolutionary advances in miniature high resolution display technology have not only made color projection pervasive, but have permitted the migration of color projection into working and leisure environments. These trends place increasingly stringent demands on existing projection technologies, which are either emissive devices, such as cathode-ray tubes (CRTs), or contain a high-resolution spatial light modulator (SLM) and an internal illumination source, such as Digital Micromirror Displays (DMDs) and liquid crystal displays (LCDs).

While conventional, self-luminous CRT projection systems are capable devices, they suffer from a number of shortcomings that may limit their future utility in projection imaging applications. For example, the broad spectral linewidth of phosphors results in poor color performance, while brightness is limited by a number of effects. Similarly, conventional LCD projection systems are limited in intensity because of the optical damage threshold of the SLM, the highly absorptive polarizers required, and the inefficient use of the internal illumination source. Additionally, DMDs are mechanically complex and must operate at high switching speeds in order to create grey scale via time sequential algorithms.

As a result of these and other shortcomings, the projected large-scale images produced by these conventional systems can appear dim and blurred. The dimness and blurring can be eliminated by providing more optical power and spectral purity. Both of these requirements can be fulfilled by, for example, laser sources.

Laser-based projection displays systems, however, can be cost prohibitive for leisure environments, and in particular for home use. Laser-based projection displays often illuminate areas in the 10×15 foot range, and are typically utilized in convention centers and other large forums. These laser-based systems produce large, bright, sharp images by incorporating several large lasers. These large laser sources can consume a significant amount of electrical power and space. The image production methods utilized by these laser-based projection systems often employ scanning techniques, for example a front or a back scanned illumination system, that requires additional subsystems. The additional subsystems can result in higher initial costs as well as other long-term costs due to maintenance associated with the subsystems.

It can therefore be appreciated that it would be desirable to develop a projection imaging system capable of home use that employs the advantages of the laser-based systems. The desirable projection imaging system should provide: 1) an efficient delivery of a bright image; 2) a high color purity; and 3) a minimal chromatic aberration.

OBJECTS AND ADVANTAGES OF THE INVENTION

It is a first object and advantage of this invention to provide a projection imaging system that overcomes the foregoing and other problems.

It is another object and advantage of this invention to provide a laser-based projection imaging system that ensures a bright image and efficient delivery of optical power.

It is a further object and advantage of this invention to provide an electronically addressable pixelated loss element wherein regions of the loss element are selectively made transparent to effectively create an image composed of lasing pixels.

Further objects and advantages of this invention will become more apparent from a consideration of the drawings and ensuing description.

SUMMARY OF THE INVENTION

The foregoing and other problems are overcome and the objects of the invention are realized by methods and apparatus in accordance with embodiments of this invention, wherein a laser-based projection imaging system is operated in an image mode and a low-voltage, spatially patterned loss element is selectively activated to create an image composed of lasing pixels.

In accordance with the present invention, a method for producing a projection image includes the steps of: providing pump energy for exciting a gain medium disposed within a laser cavity; in response to the excitation, emitting optical energy from the gain medium, wherein the emitted optical energy oscillates within the laser cavity; during an image mode, selectively activating regions of a pixelated loss element disposed in the laser cavity within an oscillation path of the optical energy; wherein when in an on-state, first regions of the pixelated loss element are made transparent to allow the oscillating optical energy to travel through the first regions of the loss element, and wherein when in an off-state, second regions of the pixelated loss element are made reflective to scatter the oscillating optical energy encountering the second regions of the loss element; and outputting the oscillating optical energy that travelled through the first regions of the pixelated loss element to create the projection image.

Preferably, the pixelated loss element is a pixelated polymer dispersed liquid crystal (PDLC) device and the step of selectively activating regions of the pixelated loss element further comprises the steps of: forming electronically addressable pixels on the PDLC device; and during the on-state, applying an electric field to selective ones of the electronically addressable pixels to align nematic directors within liquid crystals disposed in the PDLC device to produce a spatially uniform index of refraction and to render the selective ones of the pixels substantially transparent.

In one embodiment, the electronically addressable pixels are formed on the PDLC device by photolithographically patterning glass plates that enclose the liquid crystals and a polymer host solution of the PDLC device. The patterning defines a matrix of N rows by M columns, such that the intersection of a row and a column form one of the electronically addressable pixels. As a result, the emitted, oscillating optical energy is outputted by collecting optical energy emitted by the N×M pixel matrix to form a lasing pixel array and projecting the lasing pixel array to create the projection image. Varying image patterns within the lasing pixel array can be realized by applying the electric field to selectively activate different ones of the electronically addressable pixels.

BRIEF DESCRIPTION OF THE DRAWINGS

The above set forth and other features of the invention are made more apparent in the ensuing Detailed Description of the Invention when read in conjunction with the attached Drawings, wherein.

Identically labelled elements appearing in different ones of the above described figures refer to the same elements but may not be referenced in the description for all figures.

DETAILED DESCRIPTION OF THE INVENTION

As discussed in the Background, current laser-based projection imaging methods employ a front or a back laser scanned illumination system. This approach, although producing large, bright, and sharp images, can be undesirable due to the associated maintenance needs of all the subsystems, and also require several large lasers with significant power consumption and space needs.

Figure 1:
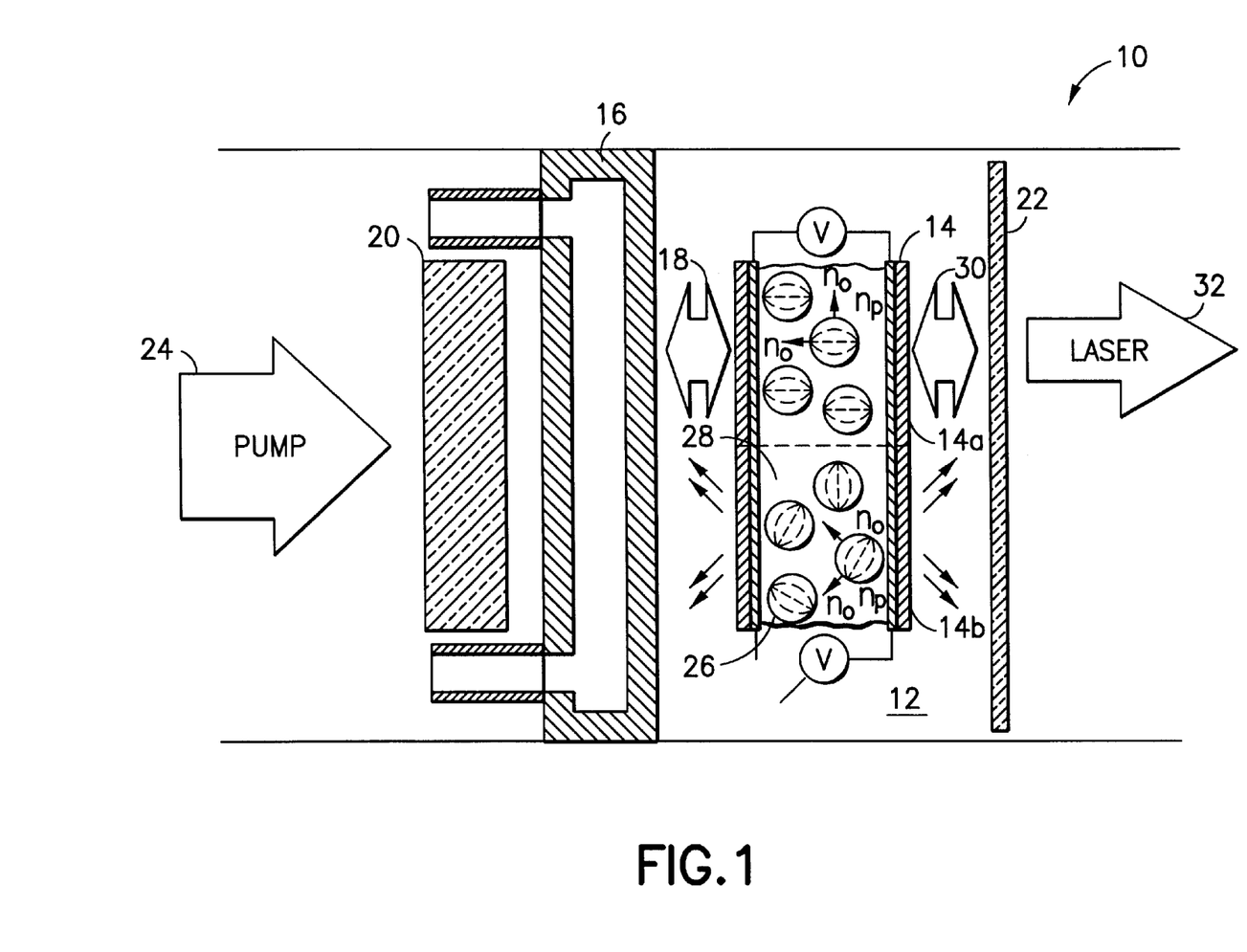
FIG. 1 is a schematic diagram of a lasing pixel device operating within a laser cavity of a projection imaging system of the present invention.

In the present invention, a laser-based projection imaging system provides a bright and efficient delivery of optical power, spectral purity, and relative low cost. As shown in FIG. 1, the projection imaging system of the present invention employs a lasing pixel device 10 that operates in an image mode within a laser cavity 12 of the projection imaging system. The image mode method in accordance with an aspect of this invention generates full-color images by mixing three image sources of different color (e.g., red, blue and green). This method enhances conventional projection system liquid crystal technology to produce imaging and uses, for example, a laser-based illumination source to provide pump energy for the lasing process. It is noted that the image mode method eliminates scanning of individual lasers while still yielding images with the brightness and chromatic purity at least the equal of conventional laser-scanned systems.

As shown in FIG. 1, the image mode is accomplished by placing a spatially patterned, low-voltage modulated variable loss element 14 inside an optically pumped high-gain laser cavity 12. A dichroic mirror 20 is located at one end of the laser cavity 12. An output coupling mirror 22 is located in the cavity 12 at an end opposite the dichroic mirror 20. A laser gain medium 16 is disposed within the cavity 12 between the dichroic mirror 20 and the output coupling mirror 22. The loss element 14 is disposed in the cavity 12 at a location between the laser gain medium 16 and the output coupling mirror 22.

As a result of this configuration, pump energy 24 is transmitted through the dichroic mirror 20 and excites the laser gain medium 16. When the laser gain medium 16 is in a high loss (scattering) state, the laser is below threshold and does not emit a significant amount of optical radiation. That is, in the high loss state a small amount of the optical energy due to spontaneous emission of the gain medium 16 may interact with the loss element 14. When the laser gain medium 16 is in a low-loss to transparent state, the laser is above threshold and high optical energy 18 is emitted. The laser cavity 12 supports internal oscillation of the optical energy 18 between the dichroic mirror 20 and the output coupling mirror 22. The laser cavity 12 also supports transverse mode profiles within the cavity.

It can be appreciated that the optical energy 18 encounters the loss element 14 as it oscillates within the cavity 12 between the dichroic mirror 20 and the output coupling mirror 22. In accordance with the present invention, the loss element 14 is an electronically addressable pixelated device which can be activated to make pixels selectively transparent. Thus, as is shown in FIG. 1, a first region 14a of the loss element 14 is transparent and the optical energy 18 travels through the transparent region 14a of the loss element 14 with negligible scattering. Alternatively, a second region 14b of the loss element 14 is reflective and scatters the optical energy 18. As a result, the scattered optical energy does not contribute to the oscillation build-up within the cavity. The ability to make regions of the pixelated loss element 14 selectively transparent effectively creates an image composed of lasing pixels. The ability to make the loss element selectively transparent is discussed in detail below.

In one embodiment, the loss element 14 is a pixelated, polymer dispersed liquid crystal (PDLC) device. The PDLC enables low-voltage controlled scattering, robustness, mechanical stability, ease of fabrication, and high throughput without the use of polarizers. Preferably, the PDLC is comprised of a mixture of optically anisotropic liquid crystals and a polymer solution placed in a thin layer (approximately 5$\mu$m) between two glass plates coated with a transparent electrical conductor, for example, indium tin oxide (ITO). A pixel array is created, for example, by photolithographically patterning the ITO plates into a matrix comprised of N rows by M columns. The intersection of a row and a column form an electronically addressable cell or pixel, for example, the first region 14a or the second region 14b of the loss element 14 shown in FIG. 1.

The liquid crystal and polymer solution are combined, for example, in a 4:1 ratio by weight and cured using ultraviolet light from a mercury lamp. Preferably, materials are chosen such that the ordinary refractive index of the liquid crystal, which lies in the plane orthogonal to the long axis, is the same as the refractive index of the polymer, while the extraordinary index differs by about 0.2. Suitable materials include liquid crystal model number TL205 and a polymer solution model number PN393 from E. Merck of Darmstadt, Germany.

When the liquid crystal/polymer mixture is cured, the liquid crystals disperse into microdroplets 26 of, for example, about 1 micron in diameter. In the absence of any applied electric field (an "off-state"), the liquid crystal microdroplet nematic directors ($n_e$, $n_o$, $n_p$) are aligned randomly with respect to each other, resulting in a refractively inhomogeneous medium that scatters incident light. That is, the symmetry axes of the microdroplets 26 are randomly oriented and light normally incident to the device, for example the optical energy 18, is scattered by the effective refractive index differences between the microdroplets 26 and the host polymer 28.

Under an applied electric field of, for example about 1 volt/micron (an "on-state"), the liquid crystal microdroplet nematic directors align in the direction of the electric field, i.e. the microdroplets 26 align with their long axis parallel to the applied field producing a spatially uniform index of refraction and rendering the region transparent. Thus, in the on-state, incident light travelling in the direction of the electric field, for example the optical energy 18, encounters the now transparent medium and is transmitted through the loss element 14 with negligible scattering. The transmitted optical energy 30 then encounters the output coupling mirror 22. A first portion of the transmitted optical energy 30 is reflected by the output coupling mirror back into the cavity 12 while a second portion of the optical energy 30 is transmitted through the output coupling mirror 22 as the output laser, i.e. a projected image 32.

Adaptation of the PDLCs into lasing pixel technology is straightforward since they are video rate capable and have electrical switching properties compatible with current active matrix display technology. Further, active-matrix PDLCs can substantially eliminate the optical losses associated with polarizers while offering the benefits of simplified fabrication and low turn-on voltages, for example about 7 volts, that are consistent with conventional logic standards.

Additionally, the inherent narrow band spectral output of a laser guarantees color purity. High brightness is achieved because the maximum brightness of the display is not limited by the amount of incident light, i.e. the amount of optical energy 18, that the loss element 14 can withstand before being damaged. Rather, in the off-state only a small amount of the total optical energy 18 due to spontaneous emission of the gain medium 16 interacts with the loss element 14. The optical energy level is low as the spontaneous emission is omni-directional covering $4\pi$ steradians with only a small function of this energy being directed into the device volume. This is in contrast to conventional systems where a loss element is placed outside the laser cavity where intense directional laser light is always incident on it, thus limiting the maximum output intensity of the laser to the element's optical damage threshold.

In one embodiment of the present invention, the gain medium 16 is a flowing laser dye. The pump absorption length of the gain medium 16 is adjusted to absorb all of the pump energy, and thus, prevent the pump energy from reaching the PDLC 14. As noted above, in the off-state, optical damage is minimized because the only light incident on the liquid-crystal material is the spontaneous emission of the dye, which is distributed over $4\pi$ steradians.

Turning now to the output power of the laser, a Rigrod large output coupling analysis is used to model the output of a lasing pixel as a function of applied voltage. That is, the analysis is used to measure the power that can be coupled outside the laser cavity 12 through the output coupling mirror 22. In one embodiment of the invention, the laser cavity 12 forms a flat mirror Fabry-Perot resonator in which emitted optical energy scattered off-axis does not contribute to the oscillation buildup. As discussed above, the PDLC is a variable loss element 14 with its transmission being the measured far-field on-axis transmission. Since the PDLC is placed between the gain medium 16 and the output coupling mirror 22, this transmission can be incorporated into the output coupling mirror transmission and reflection coefficients in the Rigrod equation for power extraction efficiency. Since the forward traveling intensity passes through the PDLC twice when reflected, the total reflectivity of the output coupling mirror 22 is represented by the following formula:

$$R_t = R_2 * T_p^2 \tag{1}$$

where: $R_2$ is the output mirror reflection coefficient and $T_p$ is the PDLC transmission coefficient.

The total output coupling is then represented by the formula:

$$T_t = T_2 * T_p \tag{2}$$

where: $T_2$ is the transmission of the output coupling mirror 22.

Substituting into the power extraction efficiency equation yields:

$$\eta = \frac{T_2 * T_p}{\left(1 + \sqrt{\frac{R_2 * T_p^2}{R_1}}\right) * \left(1 - \sqrt{R_1 * R_2 * T_p^2}\right)} * \left(1 + \frac{\ln(R_1 * R_2 * T_p^2)}{4 * \alpha_0 * L_m}\right) \tag{3}$$

where: $L_m$ is the gain medium length and $\alpha_o$ is the unsaturated amplitude gain coefficient of the medium.

In one embodiment, a lasing pixel array is constructed using a laser dye Rhodamine 6G in ethylene glycol ($2.5 \times 10^{-4}$ molar concentration) as the laser gain medium 16. The laser gain medium 16 is circulated through about a 500 micron thick dye flow cell. The dye is excited by an optical pump comprised of about 532 nm, 7 ns pulses at 20 Hz emitted by, for example, a frequency doubled Q-switched Nd-YAG laser, and passed through the dichroic mirror 20. As noted above, the dichroic mirror 20 is the rear mirror of the laser cavity 12. The dye concentration is adjusted so that the pump beam is absorbed before reaching the PDLC loss element 14. The concentration is also adjusted to maximize conversion efficiently and to prevent damage to the PDLC by the transmitted pump beam. The air/glass interface of the PDLC gave a 4% reflection and acted as a nearly optimized output coupling mirror 22.

The intracavity PDLC loss element 14 is comprised of a mixture of liquid crystals and a polymer solution, as noted above, in a ratio of about 4:1 by weight. The mixture is UV cured into a 10 micron thick film between two transparent conducting ITO coated glass plates. The ITO coated glass plates are pixelated into the N×M array, for example, a 7×7 array of passively-driven 100×100 micron square pixels with 100 micron inter-pixel spacing. The light from the lasing pixels is collected into a fiber optic bundle by a collecting lens, and then is spectrally analyzed using an optical multichannel analyzer.

Figure 2:
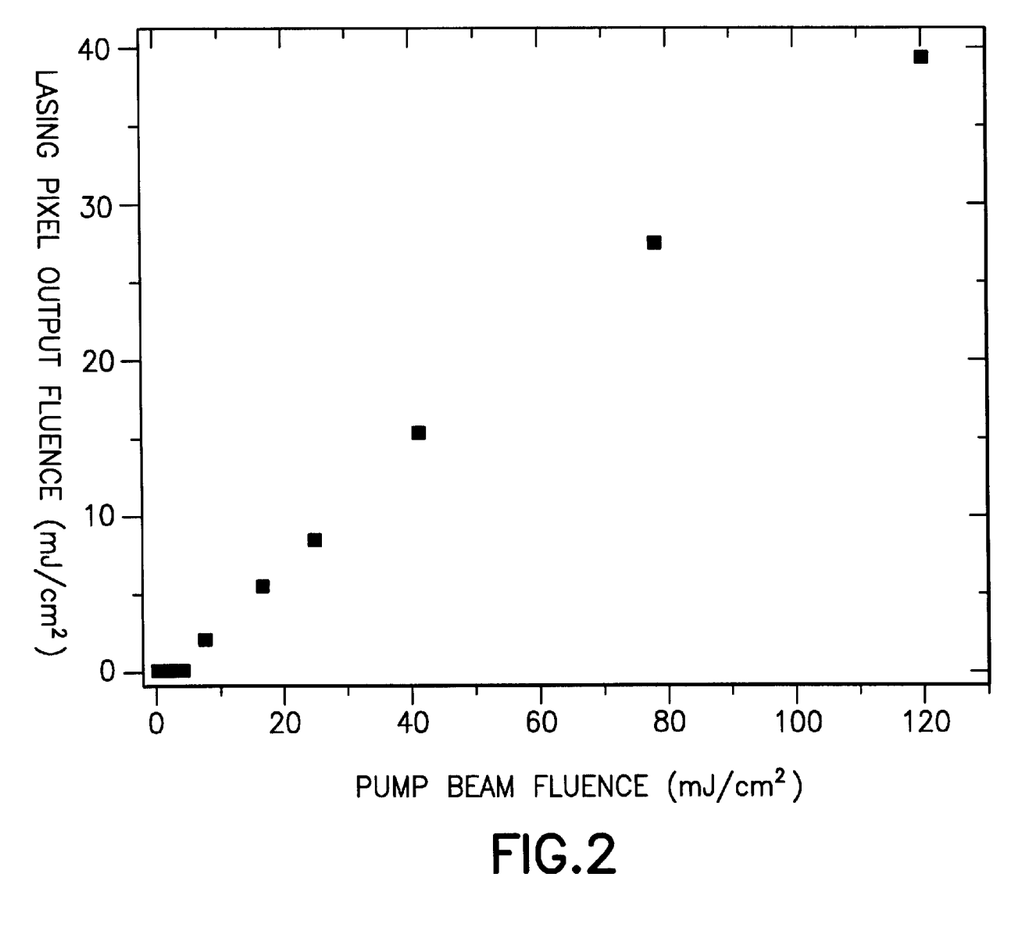
FIG. 2 is a graphical representation of a laser threshold curve that plots total energy emitted by a pixel between wavelengths 557 nm to 565 nm as a function of pump fluence.

An input-output curve of a single pixel of the above embodiment is shown in FIG. 2. As is shown in FIG. 2, the threshold of the lasing pixel is about 4.1 mJ/cm$^2$ when the lasing pixel device 10 is fully turned on. The maximum value corresponds to over 600 lm/cm², which far exceeds the current largest recorded value of 5 lm/cm² at the faceplate for a CRT-based projection imaging system.

Figure 3:
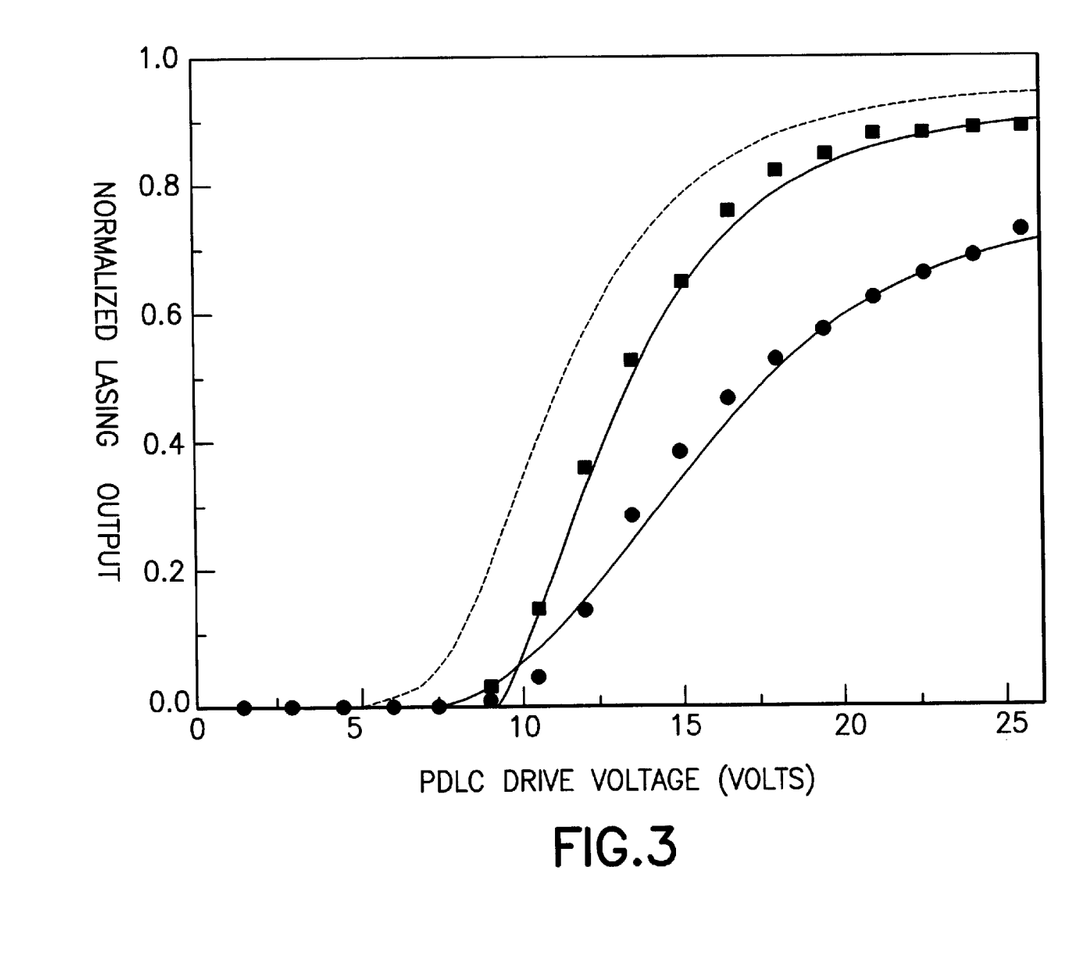
FIG. 3 is a graphical representation of the efficiency of a lasing pixel plotted as a function of an applied voltage for 96% and 15% output coupling values, and a plot of the measured PDLC transmission values.
Figure 4A:
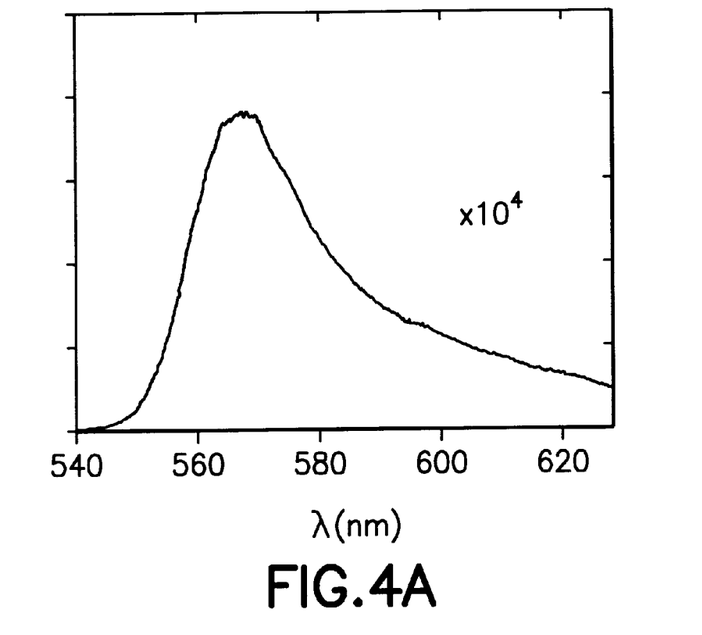
FIGS. 4A and 4B are graphical representations of the energy between wavelengths 540 nm to 620 nm for an off-state and an on-state of the lasing pixel device operating in accordance with the present invention.
Figure 4B:
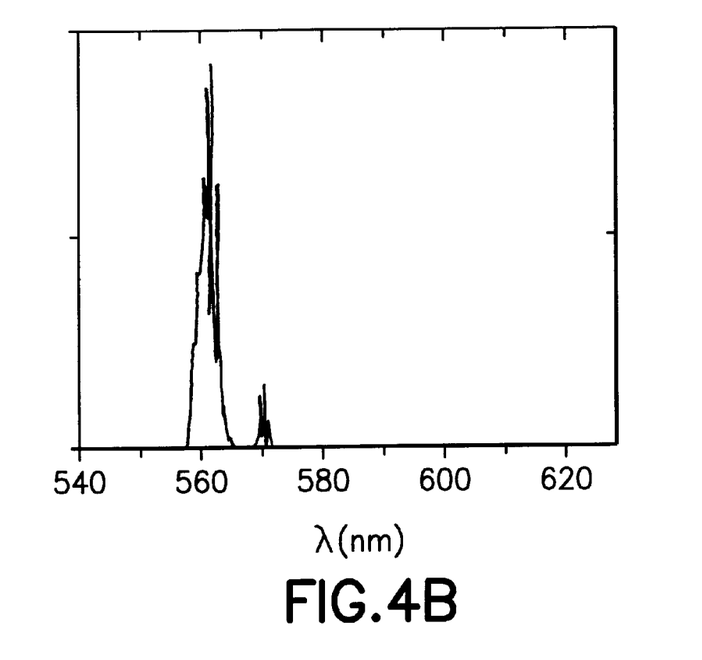
Figure 5A:
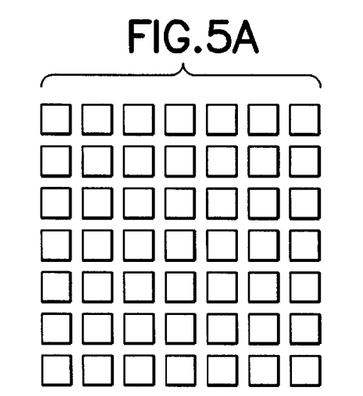
FIGS. 5A–5D are schematic representations of exemplary pixel array imaged outputs of the lasing pixel device operating in accordance with the present invention.
Figure 5B:
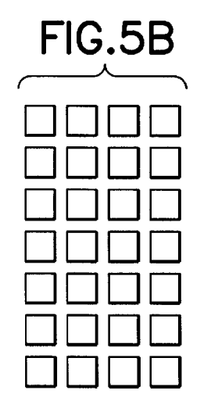
Figure 5C:
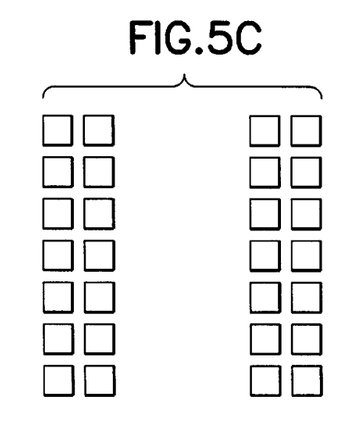
Figure 5D:
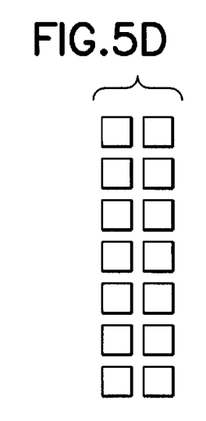

In FIG. 3, the output of the lasing pixel device 10 as a function of the voltage applied to a pixel at a pump fluence of 43 mJ/cm², for output coupling values of 96% (air/glass) and 15% (using an additional partially reflecting mirror), along with the theoretical model curves. In FIG. 3, the 96% output coupling value is plotted as a series of squares ("■") and the 15% output coupling value is plotted as a series of circles ("●"), while the measured PDLC values are plotted as a series of dots (". . .") FIGS. 4A and 4B show the spectra of the pixel in the off-state (FIG. 4A) and the on-state (FIG. 4B). The linewidth, which is measure at the full width at half maximum (FWHM), remained at a constant value of about 3 nm in the on-state.

FIGS. 5A–5D show the imaged output of the patterned array for various pixel states. The far-field image was created by focussing the output beam to image the plane of the PDLC onto a viewing screen. Lasing efficiencies reached 40% when a 100% reflective dichroic mirror and a glass-air interface were used as the laser cavity mirrors, 20 and 22 respectively. This corresponds to an output of more than 600 lumens/cm² at a wavelength of 570 nm. In comparison, extremely high-voltage, water-cooled projection CRT systems have achieved outputs of only about 5 lumens/cm².

To understand coupling between pixels and to determine how the pixelated PDLC loss element 14 shapes the resonator mode, numerical stable-mode resonator simulations of the lasing pixel array device 10 were performed using the Fox and Li method with a FFT approach. The simulations were then compared to experiments which assumed an infinitely large, perfectly reflecting cavity optics and modeled the PDLC pixels as infinitely thin slits. Thus, the resonator is treated as an infinite progression of slit apertures. The distance between apertures is alternated between twice the distance from the PDLC loss element 14 to the dichroic mirror 20 and twice the distance to the output coupling mirror 22. Because the flat high-Fresnel-number geometry violates the small angle approximation, the complete integral of the Fresnel diffraction kernel is used in the simulations.

Simulations were performed to determine the regime of resonator conditions under which a laser-based projection imaging system operating in accordance with the present invention would emit an image mode replicating the internal loss pattern. A pixelation Fresnel number ($N_F$) is defined as:

$$N_F = \frac{ab}{2\lambda L}$$

where a is the pixel width, b is the pixel separation, and L is the distance from the PDLC to the most distant mirror.

Figure 6A:
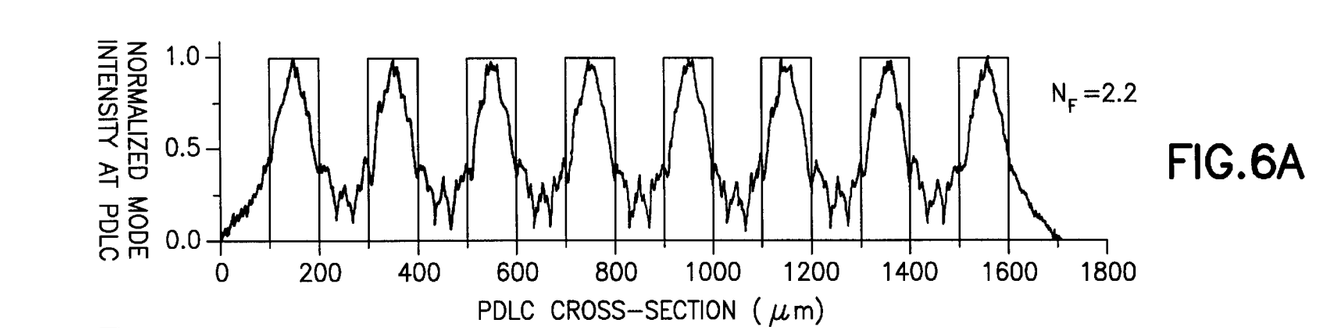
FIGS. 6A–6C are graphical representations of stable mode profiles of lasing pixel devices whose cavities are of varying Fresnel Numbers ($N_F$)
Figure 6B:
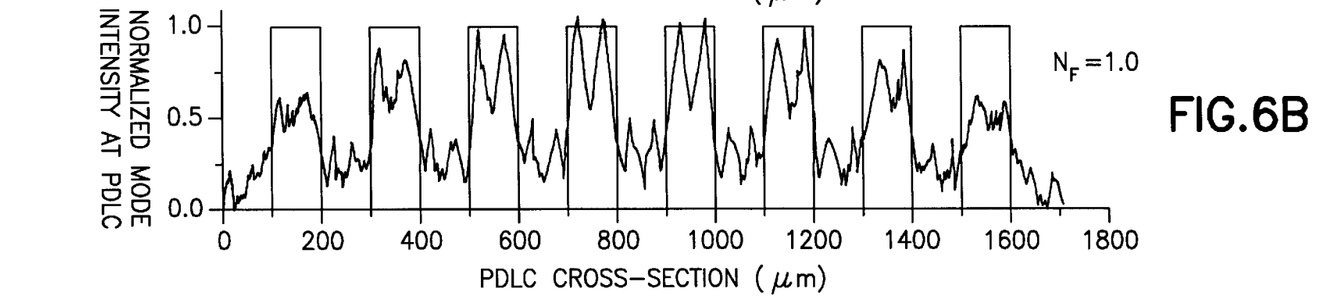
Figure 6C:
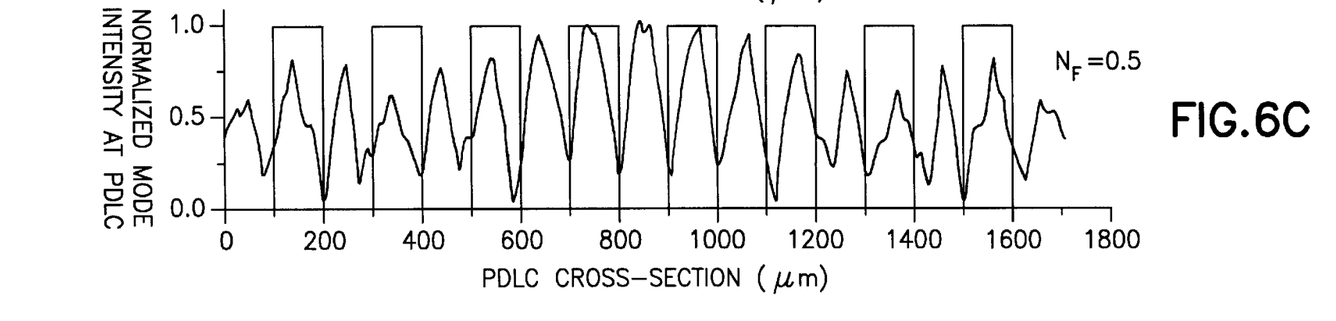

FIGS. 6A–6C show the results of simulations for resonator cavities of various Fresnel numbers, and demonstrates that the image mode method results in a faithful replica of the intracavity spatial pattern at high Fresnel numbers. The simulations indicate that coupling of pixel energy from diffraction loses are weak if the Fresnel number ($N_F$) of the cavity is approximately greater than about 2. Thus, it was determined that the desired image mode is generated under resonator conditions where the $N_F$ is greater than about 2. As $N_F$ decreases, the mode confinement beaks down, which can adversely effect image production and result in optical damage in the off-state pixels.

Figure 7:
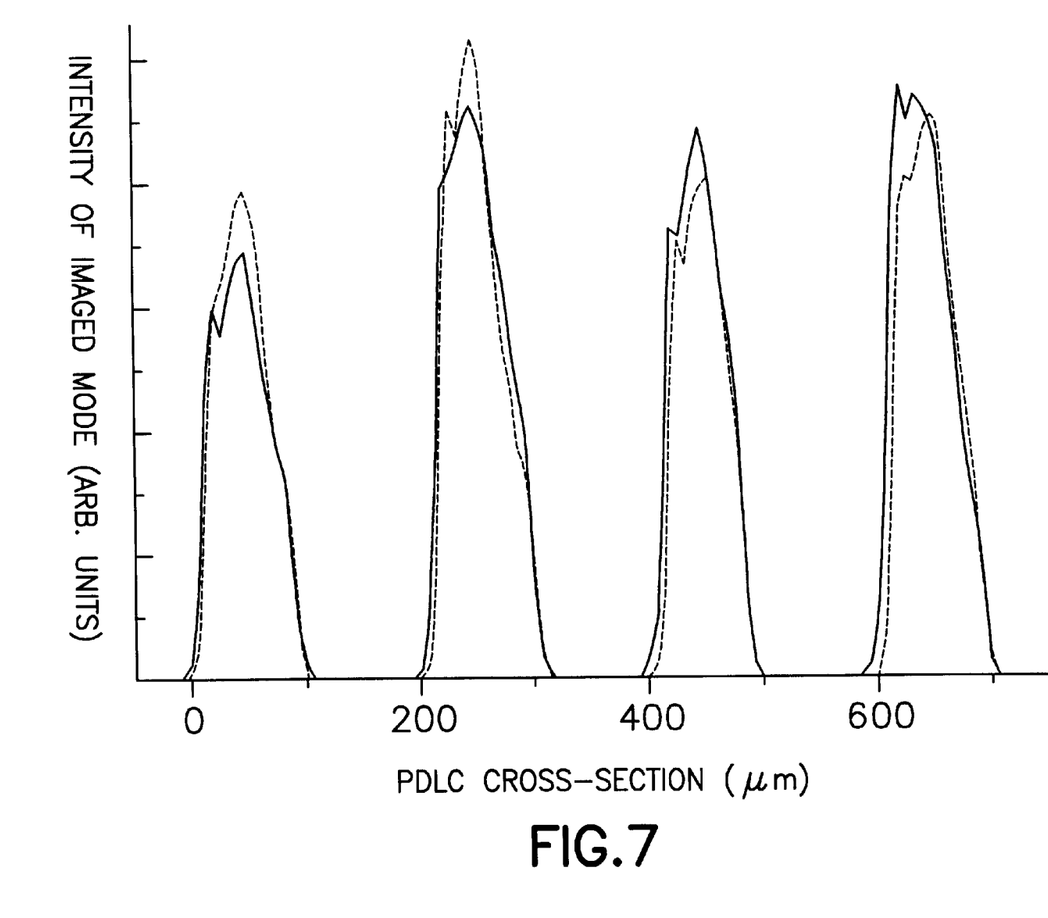
FIG. 7 is a graphical representation of the intensity of pixels imaged onto a charge-coupled device (CCD) array that demonstrates the transverse mode structure of the output pixels.

These simulations are consistent with the Fox and Li results, which predict diffraction losses of less than 2% for the lowest-order traverse mode of such a laser cavity. In order to test the pixel coupling simulations, the structure and intensities of four pixels in all on/off permutations were studied. This data is shown in FIG. 7. The largest normalized standard deviation of the logarithmetic intensity of any pixel (accounting for the human eye's response) was 1.6%, indicating that pixel coupling was weak. Work continues to implement an image mode display with an active matrix display with a pixel size of about 17 μm and a fill factor of about 50%.

Figure 8:
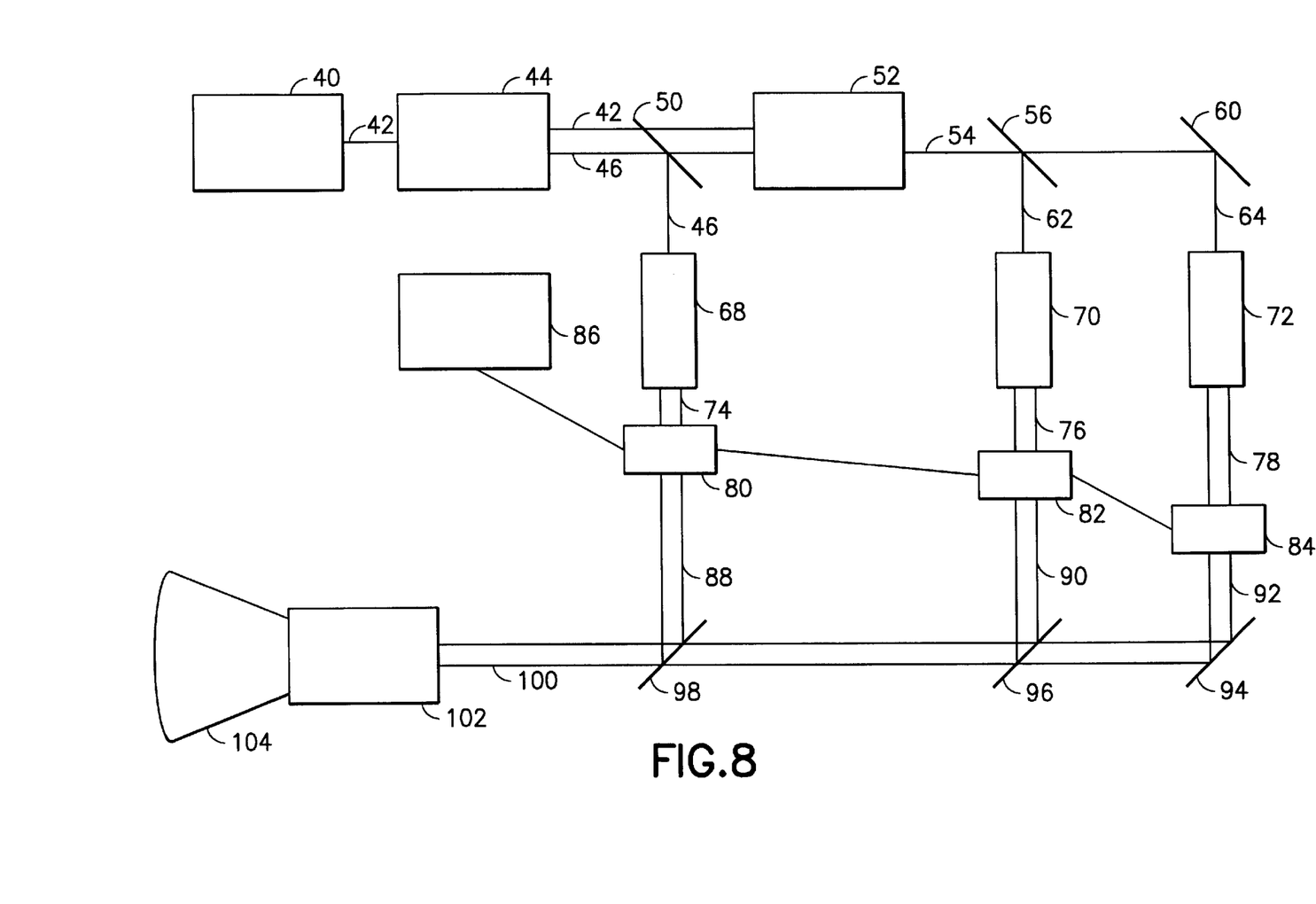
FIG. 8 is a schematic diagram of an exemplary embodiment of a projection imaging system that operates in accordance with the present invention.

FIG. 8 illustrates an exemplary embodiment of a laser-based projection imaging system that operates in accordance with the present invention. The laser-based projection imaging system employs a laser pump source 40, a second harmonic generation unit 44, a first dichroic mirror 50, a sum frequency generation unit 52, a beam splitter 56, a first directional mirror 60, beam expanders 68, 70 and 72, pixelated polymer dispersed liquid crystals (PDLCs) devices 80, 82 and 84, drive electronics 86, a second directional mirror 94, a second dichroic mirror 96, a third dichroic mirror 98, and projection optics 102.

As discussed above, the image mode method generates full-color pictures by mixing three image sources of different color (e.g., red, blue and green). A full red-green-blue (RGB) projection imaging system is accomplished by first generating an initial pump energy 42 from the laser pump source 40 which is, for example, a diode-pumped Nd:YAG laser. The initial pump energy 42 of, for example 1064 nm wavelength, is passed to the second harmonic generating unit 44. The second harmonic generating unit 44 receives the initial pump energy 42 and outputs two pump energies, i.e. a pump energy 46 that is a second harmonic of the fundamental frequency of the initial pump energy 42, for example a 532 nm wavelength, and the initial pump energy 42. The first dichroic mirror 50 transmits the initial pump energy 42 and the second harmonic pump energy 46, both output by the second harmonic generating unit 44, to the sum frequency generation unit 52. The dichroic mirror 50 also reflects the second harmonic pump energy 46 to the beam expander 68.

The sum frequency generation unit 52 receives the initial pump energy 42 and the second harmonic pump energy 46 and generates a 355 nm pump energy 54 that is a third harmonic of the fundamental frequency of the initial pump energy 42. The 355 nm pump energy 54 is output by the sum frequency generation unit 52 and is passed to the beam splitter 56. Beam splitter 56 splits the 355 nm pump energy 54 by reflecting a part 62 of the 355 nm pump energy 54 to the beam expander 70 and by transmitting another part 64 of the 355 nm pump energy 54 to the first directional mirror 60. The first directional mirror 60 reflects the part 64 of the 355 nm pump energy 54 to the beam expander 72.

The beam expanders 68, 70 and 72 expand, or widen, the received pump energies 46, 62 and 64, respectively. A first widened, 532 nm wavelength pump energy 74 is output by the beam expander 68 and is passed to the first pixelated PDLC device 80. In accordance with this full-RGB projection imaging system, the first pixelated PDLC device 80 includes a red laser dye, for example Rhodamine 6G, as a laser gain medium. The first widened pump energy 74 excites the red laser dye to emit optical energy. In cooperation with drive electronics 86, pixels of the pixelated PDLC device 80 are selectively made transparent such that the optical energy is emitted from the first pixelated PDLC device 80 as optical energy 88.

Similarly, a second widened pump energy 76 excites a green laser dye, for example Coumarin 500, that is a laser gain medium within the second pixelated PDLC device 82.

Accordingly, the second widened pump energy 76 excites the green laser dye to emit optical energy. The drive electronics 86 cooperate with the second pixelated PDLC device 82 to selectively make pixels of the second PDLC device 82 transparent and to emit optical energy 90. A third widened pump energy 78 excites a blue laser dye, for example Coumarin 480 or a suitable stilbene, that is a laser gain medium within the third pixelated PDLC device 84. The third widened pump energy 78 excites the blue laser dye to emit optical energy. The drive electronics 86 cooperate with the third pixelated PDLC device 84 to selectively make pixels of the third PDLC device 84 transparent and to emit optical energy 92.

The third pixelated PDLC device 84 directs the optical energy 92 to the second directional mirror 94. The directional mirror 94 reflects the optical energy 92 to the second dichroic mirror 96. The second dichroic mirror 96 transmits the optical energy 92 and the optical energy 90 (received from the second pixelated PDLC device 82) to the third dichroic mirror 98. The third dichroic mirror 98 transmits the optical energies 90 and 92, and the optical energy 88 (received from the first pixelated PDLC device 80) to the projection optics 102 as a combined optical energy 100. The projection optics 102 processes the combined optical energy 100 to produce the full-color image 104 of the RGB projection imaging system.

To achieve the largest possible image color palette, the RGB components are chosen near the three corners of the chromaticity diagram. For example, this can be accomplished by selection of organic dyes for gain media, i.e. the red laser dye Rhodamine 6G, the green laser dye Coumarin 500, and the blue laser dye Coumarin 480, and by utilizing dichroic mirrors in the individual optical energy generation paths.

Although described in the context of preferred embodiments, it should be realized that a number of modifications to these teachings may occur to one skilled in the art. By example, and as discussed above, the teachings of this invention are not intended to be limited to any specific laser gain medium, such as only flowing organic dyes. It is within the scope of this invention to provide solid state laser gain medium, for example, polymeric semiconductors including PPV, MEH-PPV, BDOO-PF and HEH-PF, within each of the pixelated PDLC devices. Under certain situations, the polymeric semiconductor medium may be desirable for they do not face the solubility limits of the organic dyes and can thus achieve high gain in very thin geometries. In addition, the solid state polymers can be directly spincoated onto PDLC cells, facilitating resonator length reductions that are necessary for the smaller pixel sizes required for high resolution.

While the invention has been particularly shown and described with respect to preferred embodiments thereof, it will be understood by those skilled in the art that changes in form and details may be made therein without departing from the scope and spirit of the invention.

What is claimed is:

1. A method for producing a projection image comprising the steps of:
   providing pump energy for exciting a gain medium disposed within a laser cavity;
   in response to the excitation, emitting optical energy from the gain medium, wherein the emitted optical energy oscillates within the laser cavity;
   during an image mode, selectively activating regions of a pixelated loss element disposed in the laser cavity within an oscillation path of the optical energy;
   wherein when in an on-state, first regions of the pixelated loss element are made substantially transparent to allow the oscillating optical energy to travel through the first regions of the loss element, and wherein when in an off-state, second regions of the pixelated loss element are made reflective to scatter the oscillating optical energy encountering the second regions of the loss element; and
   outputting the oscillating optical energy that travelled through the first regions of the pixelated loss element to create the projection image.

2. A method as set forth in claim 1, wherein the step of providing pump energy for exciting the gain medium further comprises a step of providing optical pump energy for exciting the gain medium.

3. A method as set forth in claim 2, wherein the gain medium is a flowing laser dye whose pump absorption length is adjusted to absorb substantially all of the pump energy and to minimize optical damage by preventing the pump energy from reaching the off-state, second regions of the loss element.

4. A method as set forth in claim 1, wherein the pixelated loss element is a pixelated polymer dispersed liquid crystal (PDLC) device, and wherein the step of selectively activating regions of the pixelated loss element further comprises the steps of:
   forming electronically addressable pixels on the PDLC device; and
   during the on-state, applying an electric field to selective ones of the electronically addressable pixels to align nematic directors within liquid crystals disposed in the PDLC device to produce a spatially uniform index of refraction and to render the selective ones of the pixels substantially transparent.

5. A method as set forth in claim 4, wherein the step of forming the electronically addressable pixels on the PDLC device further comprises the step of photolithographically patterning glass plates that enclose the liquid crystals and a polymer host solution of the PDLC device, the patterning defining a matrix of N rows by M columns, wherein an intersection of a row and a column form one of the electronically addressable pixels.

6. A method as set forth in claim 4, wherein the applied electrical field is about 1 volt/micron.

7. A method as set forth in claim 5, wherein the step of outputting the oscillating optical energy further comprises the steps of:
   collecting optical energy emitted by the N×M pixel matrix to form a lasing pixel array; and
   projecting the lasing pixel array to create the projection image;
   wherein varying image patterns within the lasing pixel array are realized by applying the electric field to selectively activate different ones of the electronically addressable pixels.

8. A projection imaging system including a resonator cavity, wherein said resonator cavity is defined, at one end by a dichroic mirror and at an end opposite said dichroic mirror, by an output coupling mirror, said projection imaging system comprising:
   a pump source for emitting pump energy;
   a gain medium located within said cavity between said dichroic mirror and said output coupling mirror;
   wherein when said pump source emits said pump energy, said pump energy is transmitted through said dichroic mirror and excites said gain medium to emit optical energy, and wherein said emitted optical energy oscillates within said resonator cavity; and a pixelated loss element located within said cavity between said gain medium and said output coupling mirror and further located within an oscillation path of the optical energy;

wherein when in an on-state of an image mode, first regions of said pixelated loss element are selectively made substantially transparent to allow said oscillating optical energy to travel through said first regions of said loss element, and wherein when in an off-state of said image mode, second regions of said pixelated loss element are made reflective to scatter said oscillating optical energy encountering said second regions of said loss element;

wherein a portion of said oscillating optical energy that travelled through said first regions of said pixelated loss element is transmitted by said output coupling mirror to create a projected image.

9. A projection imaging system as set forth in claim 8, wherein a pixelation Fresnel number ($N_F$) of said resonator cavity is about 2.

10. A projection imaging system as set forth in claim 8, wherein said pump source is comprised of an optical pump emitted by a Q-switched neodymium and yttrium-aluminum-garnet (Nd-YAG) laser.

11. A projection imaging system as set forth in claim 8, wherein said gain medium is comprised of a flowing laser dye whose pump absorption length is adjusted to absorb substantially all of said pump energy and to minimize optical damage by preventing said pump energy from reaching said off-state, second regions of said pixelated loss element.

12. A projection imaging system as set forth in claim 8, wherein said loss element is comprised of a spatially patterned low-voltage modulated loss element.

13. A projection imaging system as set forth in claim 8, further comprising:

a collecting lens; and a fiber optic bundle;

wherein said collecting lens collects said portion of said oscillating optical energy transmitted by said output coupling mirror, and in cooperation with said fiber optic bundle, forms said projected image.

14. A projection imaging system as set forth in claim 12, wherein said loss element is further comprised of a pixelated polymer dispersed liquid crystal (PDLC) device.

15. A projection imaging system as set forth in claim 14, wherein said PDLC device is comprised of a mixture of optically anisotropic liquid crystals and a polymer solution placed in a thin layer between two glass plates coated with a transparent electrical conductor.

16. A projection imaging system as set forth in claim 15, wherein said transparent electrical conductor is comprised of indium tin oxide (ITO).

17. A projection imaging system as set forth in claim 15, wherein a pixel array is formed by photolithographically patterning said glass plates into a matrix of N rows by M columns, wherein an intersection of a row and a column form an electronically addressable pixel.

18. A projection imaging system as set forth in claim 17, wherein said mixture of liquid crystals and polymer solution are combined in a 4:1 ratio by weight and cured using ultraviolet light such that said liquid crystals disperse into microdroplets.

19. A projection imaging system as set forth in claim 18, wherein when in said on-state of said imaging mode and when selective ones of said pixels are exposed to an electric field, nematic directors of said liquid crystal microdroplets within said exposed pixels align to produce a spatially uniform index of refraction and to render said selectively exposed pixel substantially transparent.

20. A full red-green-blue projection imaging system comprising:

a laser-based pump source for emitting an initial pump energy;

means for producing a second harmonic frequency pump energy from said emitted initial pump energy;

means for producing a third harmonic frequency pump energy from said initial pump energy and said second harmonic frequency pump energy;

a first image source path which includes a first dichroic mirror, a first beam expander and a first pixelated PDLC device, wherein said first dichroic mirror reflects said second harmonic frequency pump energy to said first beam expander and wherein said first pixelated PDLC device includes a red laser dye which when excited by an expanded second harmonic frequency pump energy, and in cooperation with drive electronics, emits a first optical energy;

a second image source path which includes a beam splitter, a second beam expander and a second pixelated PDLC device, wherein said beam splitter reflects a portion of said third harmonic frequency pump energy to said second beam expander and wherein said second pixelated PDLC device includes a green laser dye which when excited by an expanded portion of said third harmonic frequency pump energy, and in cooperation with said drive electronics, emits a second optical energy;

a third image source path which includes a first directional mirror, a third beam expander, and a third pixelated PDLC device, wherein said first directional mirror reflects a transmitted portion of said third harmonic pump energy from said beam splitter to said third beam expander and wherein said third pixelated PDLC device includes a blue laser dye which when excited by an expanded portion of said third harmonic frequency pump energy, and in cooperation with said drive electronics, emits a third optical energy;

a second directional mirror for reflecting said third optical energy;

a second dichroic mirror for receiving said reflected third optical energy and transmitting said reflected third and reflecting said second optical energies;

a third dichroic mirror for receiving said transmitted third and said reflected second optical energies and for transmitting the received third and second optical energies and the first optical energy; and projection optics for receiving said first, said second and said third optical energies and for processing said optical energies to produce a full-color image.

21. An imaging system comprising:

a laser cavity;

a pump source for emitting pump energy;

a gain medium disposed within said laser cavity;

wherein when said pump source emits said pump energy, said pump energy excites said gain medium to emit optical energy; and a spatially patterned loss element disposed within said laser cavity, and further disposed within an output path of said optical energy;

wherein when in an image mode, said spatially patterned loss element is controlled to generate an image comprised of lasing pixels.

* * * * *